(12) United States Patent
Selvarajan et al.

(10) Patent No.: US 11,611,624 B2
(45) Date of Patent: Mar. 21, 2023

(54) DATA TRANSFER BETWEEN APPLICATION AND VEHICLE MANAGEMENT SYSTEM

(71) Applicant: Honeywell International Inc., Morris Plains, NJ (US)

(72) Inventors: Ravikumar Selvarajan, Bangalore (IN); Charles Dairman, Buckeye, AZ (US)

(73) Assignee: Honeywell International Inc., Charlotte, NC (US)

( * ) Notice: Subject to any disclaimer, the term of this patent is extended or adjusted under 35 U.S.C. 154(b) by 99 days.

(21) Appl. No.: 15/864,240

(22) Filed: Jan. 8, 2018

(65) Prior Publication Data

US 2019/0215379 A1    Jul. 11, 2019

(51) Int. Cl.
| | | |
|---|---|---|
| *G06F 15/16* | (2006.01) | |
| *H04L 67/2871* | (2022.01) | |
| *H04L 67/06* | (2022.01) | |
| *H04L 67/12* | (2022.01) | |
| *H04L 67/01* | (2022.01) | |
| *H04L 67/56* | (2022.01) | |
| *H04L 67/568* | (2022.01) | |
| *G08G 5/00* | (2006.01) | |
| *G06F 16/903* | (2019.01) | |
| *G06F 16/16* | (2019.01) | |

(52) U.S. Cl.
CPC ......... *H04L 67/2871* (2013.01); *G08G 5/003* (2013.01); *H04L 67/01* (2022.05); *H04L 67/06* (2013.01); *H04L 67/12* (2013.01); *H04L 67/56* (2022.05); *H04L 67/568* (2022.05); *G06F 16/16* (2019.01); *G06F 16/903* (2019.01)

(58) Field of Classification Search
CPC ........................ G08G 5/0043; G08G 5/0004
USPC ........................................................ 709/237
See application file for complete search history.

(56) References Cited

U.S. PATENT DOCUMENTS 7,181,507 B1    2/2007   Lavelle et al.
8,078,692 B2   12/2011   Benguigui
(Continued)

FOREIGN PATENT DOCUMENTS

CA      2769119 A1     2/2011
CN    107079057 A      8/2017
(Continued)

OTHER PUBLICATIONS

Extended European Search Report dated May 7, 2019 in European Application No. 19150129.5 (11 pages).

*Primary Examiner* — Hannah S Wang
*Assistant Examiner* — Tesfu N Mekonen
(74) *Attorney, Agent, or Firm* — Bookoff McAndrews, PLLC

(57) ABSTRACT

A method and system for transferring data is disclosed. The method comprises initiating a handshake between an electronics unit onboard a vehicle and an application via a first communication protocol through an onboard gateway; transferring a data file to the gateway from the application via a second communication protocol; storing the data file in the gateway at a storage location; sending a message from the application to the electronics unit, via the first communication protocol, to inform the electronics unit that the data file is available and the storage location of the data file; and pulling the data file from the storage location, via the second communication protocol, to the electronics unit.

17 Claims, 11 Drawing Sheets

(56) References Cited

U.S. PATENT DOCUMENTS

| | | | |
|---|---|---|---|
| 8,732,233 B2 | 5/2014 | Allen | |
| 8,995,440 B1* | 3/2015 | LeBlanc | H04L 67/06 370/390 |
| 9,092,611 B1 | 7/2015 | Heinrich | |
| 9,141,830 B2* | 9/2015 | Uczekaj | G06F 21/602 |
| 9,189,655 B2 | 11/2015 | Uczekaj et al. | |
| 9,529,356 B2 | 12/2016 | Mere et al. | |
| 9,557,189 B2 | 1/2017 | Cornell | |
| 9,694,903 B2 | 7/2017 | Beltrand | |
| 2009/0138871 A1* | 5/2009 | Kimberly | H04L 67/06 717/173 |
| 2010/0312420 A1* | 12/2010 | Sham | B64F 5/60 701/3 |
| 2011/0055422 A1 | 3/2011 | Simcoe et al. | |
| 2014/0380433 A1* | 12/2014 | Yerger | H04L 67/12 726/4 |
| 2015/0079545 A1* | 3/2015 | Kurtz | G09B 9/08 434/30 |
| 2015/0150095 A1* | 5/2015 | Mere | G05D 1/00 726/4 |
| 2016/0019793 A1 | 1/2016 | Fournier et al. | |
| 2016/0163202 A1* | 6/2016 | Marion | G08G 5/0047 701/3 |
| 2016/0290827 A1 | 10/2016 | Cornell | |
| 2018/0357561 A1 | 12/2018 | Selvarajan | |

FOREIGN PATENT DOCUMENTS

| | | |
|---|---|---|
| EP | 2 602 970 | 6/2013 |
| EP | 2 760 000 A1 | 7/2014 |
| EP | 3101536 A1 | 12/2016 |

* cited by examiner

DATA TRANSFER BETWEEN APPLICATION AND VEHICLE MANAGEMENT SYSTEM

BACKGROUND

The number of uncertified applications being developed is rapidly growing and in the near future, both certified and uncertified applications will work seamlessly together. Due to several benefits that uncertified applications offer, and also due to increasing robust connectivity between certified applications and uncertified applications, a lot of non-safety critical functionalities are increasingly being developed as uncertified applications rather than getting developed as certified applications.

There are a multitude of uncertified applications being developed for various vehicle management systems, such as a flight management system (FMS). These uncertified applications are very useful and make life easier for a vehicle operator such as a pilot. Such uncertified applications can provide access to various data sources such as the Internet, which provide data such as the weather ahead of an aircraft, the trajectory of adjacent aircrafts, traffic at destination airports, and the like. This data can be used by the pilot to make intelligent strategic decisions, which may lead the pilot to wanting to update the flight plan or other parameters within the FMS.

Currently, once information that a pilot would need to update the FMS is ready, the pilot can program the FMS manually, such as with a multi-function display (MFD) or a multi-function control and display unit (MCDU), or can send the information directly to the FMS via some kind of connectivity (e.g., Wi-Fi, Bluetooth, etc.). While connectivity is an efficient mechanism, especially during the phase of flight where the pilot workload is generally high, there are cyber security concerns with that approach. For instance, programming the FMS directly by sending data via a gateway can make the FMS vulnerable to cyber security threats. To enable this path via the Transmission Control Protocol (TCP) or User Datagram Protocol (UDP) socket connections, the FMS has to expose its Internet Protocol (IP) address related information for an application to connect to the FMS, which is where the risk lies. For example, a hacker could actually get and use the IP address to gain access to the FMS, and probably even start controlling the FMS.

Accordingly, there is a need for a solution that can enable an application to send data to the FMS wirelessly, but still prevent the FMS from exposing a direct address accessible by the application or anyone outside the secured avionics bus network.

SUMMARY

A method and system for transferring data is disclosed. A method and system for transferring data is disclosed. The method comprises initiating a handshake between an electronics unit onboard a vehicle and an application via a first communication protocol through an onboard gateway; transferring a data file to the gateway from the application via a second communication protocol; storing the data file in the gateway at a storage location; sending a message from the application to the electronics unit, via the first communication protocol, to inform the electronics unit that the data file is available and the storage location of the data file; and pulling the data file from the storage location, via the second communication protocol, to the electronics unit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
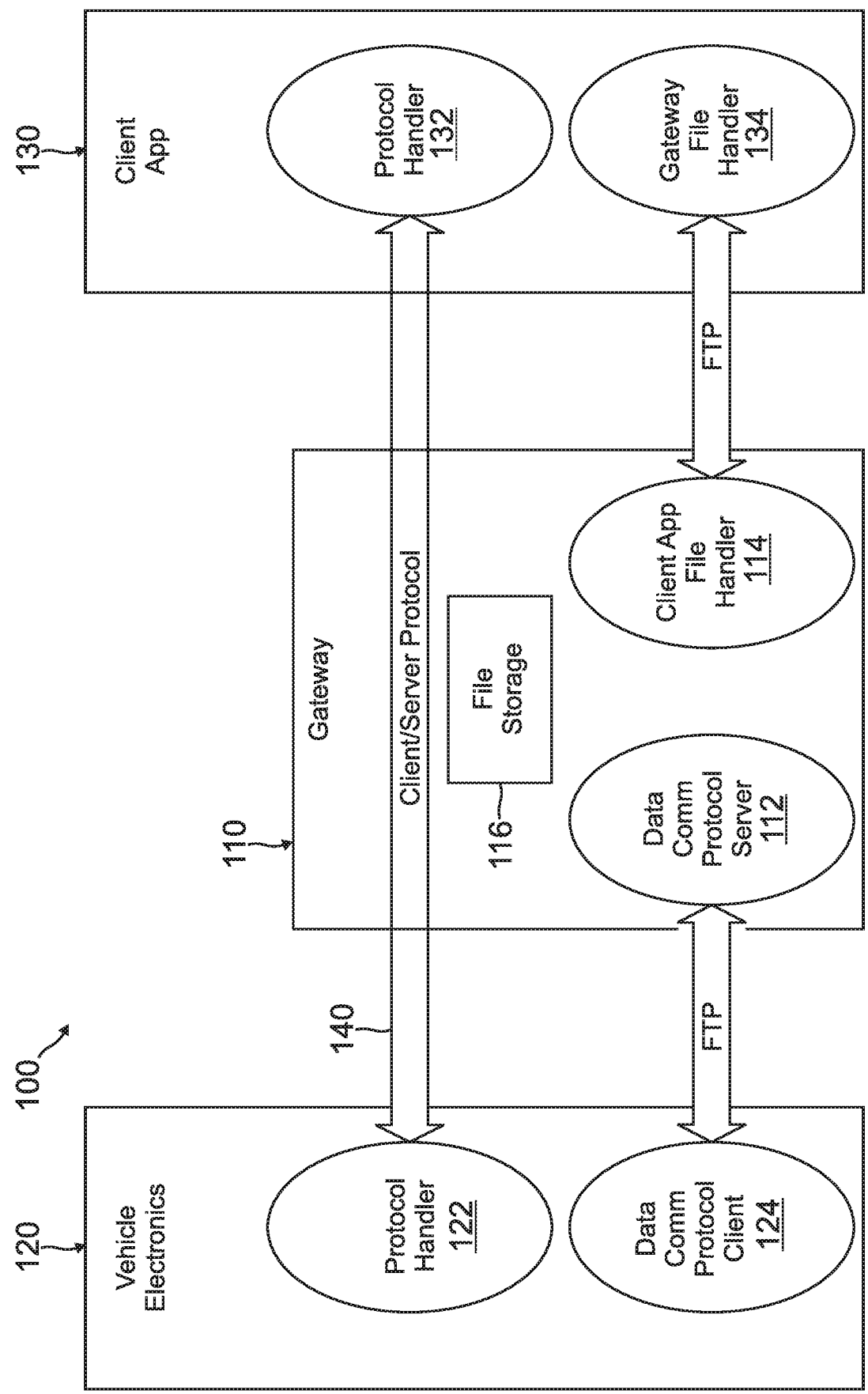
FIG. 1 is a block diagram of a data transfer system for a vehicle, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for transferring data between an application and a vehicle management system is disclosed. The method and system provide that a certified application receive data from an uncertified application in a manner that is simple, efficient, and fulfills the cyber security requirements or best practice of implementing multiple independent interlocks or protections.

As used herein, the terms "certified" and "uncertified" refer to whatever the related regulatory authority deems certified or uncertified based on the relevant industry. For example, aircraft can use applications that meet Federal Aviation Administration (FAA) or European Aviation Safety Agency (EASA) certification standards; ground vehicles and passenger ships can use applications that meet certification standards from appropriate regulatory agencies.

While the present approach for transferring data is particularly suited for data transfers in an aircraft, the present approach may also be applied to data transfers for other vehicles, such as spacecraft, watercraft, cars or other automotive ground vehicles.

The present data transfer system for a vehicle generally includes an onboard gateway, which is in operative communication with a vehicle electronics unit. The gateway is configured to communicate with at least one application (e.g., client application), such as located on a portable electronic device (e.g., tablet, laptop, smart phone, etc.). The data transfer system provides a two stage separation between the application and the vehicle electronics unit through the gateway, thereby preventing the application from taking control of the vehicle electronics unit.

When a data file is available, the data transfer system initiates a handshake between the vehicle electronics unit and the application via a first communication protocol such as a client/server protocol through the gateway. The data file is transferred to the gateway from the client application via a second communication protocol such as file transfer protocol (FTP), and the data file is stored in the gateway at a storage location. A message is sent from the application to the vehicle electronics unit, via the first communication protocol, to inform the vehicle electronics unit that the data file is available and the storage location of the data file. The data file is then pulled from the storage location, via the second communication protocol, to the vehicle electronics unit. In one implementation, the vehicle electronics unit automatically pulls the data file from the storage location. Alternatively, the vehicle electronics unit pulls the data file from the storage location after receiving a request from a vehicle operator.

When implemented in an aircraft, the data transfer system provides an effective mechanism of avoiding exposing the avionics address of a flight management system (FMS), while transferring data from a client application, such as an electronic flight bag (EFB) application or a portable electronic device (PED) application, to the FMS. In this system, a data transaction from an EFB application (or PED application) to the FMS can be initiated either by the FMS or the EFB Application. For example, the FMS can request information from an EFB application, or the EFB application can request from the FMS permission to provide information to the FMS. In either case, initial handshaking between the FMS and the EFB application happens via a client/server protocol, which is used to inform of the new data need/availability, the new file location readiness to accept new data, etc.

The EFB application can intimate availability of new data in the format of a file along with the network address of the location of the file. Alternatively, the file can be kept in a predetermined address by the EFB application of which the FMS is always aware. Using FTP, the EFB application pushes the file into an onboard gateway. Once the file is made available with the gateway and the FMS is ready for the file transaction, the FMS initiates the file transfer from the gateway by pulling the file from the gateway. The FMS can pull the file either from the address provided by the EFB application or from a predetermined location. Once the file transfer is complete, the FMS can choose to inform the EFB application about the status of the file transfer, as well as the acceptance/rejection of the file content using the client/server protocol. For example, the FMS can acknowledge the EFB application with the completion or abortion of the file transfer.

In one implementation, a data transaction from a client application to the FMS can be initiated automatically, either by the FMS or the client application, without pilot intervention. In this implementation, the FMS can also accept the file contents automatically without any pilot review. The FMS can also automatically inform the client application of the acceptance/rejection of the data via the client/server protocol. The actual file transfer involves just the FMS and the gateway, and is always initiated by the FMS.

In alternate implementations, pilot intervention can be sought at various stages of the data transfer process. For example, the pilot can initiate the client application to inform the FMS of the new data availability, or the pilot can initiate the FMS to request the client application to provide a new data set. The pilot can be intimated about the availability of a new file via a multi-function display (MFD) or a multi-function control and display unit (MCDU).

The pilot can also initiate the FMS to start an FTP transaction. For example, a client-server protocol message to the FMS from the client application can include some data to indicate the availability of a new file. On reception of such a message, the FMS informs the pilot, after which the pilot can initiate the FTP transaction by manually traversing to standard FTP pages. Alternatively, on reception of such a message, the FMS can inform the pilot about the new file, and also give an option to directly load/reject the data file or initiate/cancel the FTP transaction on the same page. The pilot can also be given the option to abort the FTP transaction any time. Once processed, the FMS can show the exact details of the changes to be applied to the FMS, upon review and approval by the pilot. The pilot can then accept/reject the file contents with the FMS after the review.

In some implementations, the FMS can be either the Flight Management Function (FMF) partition alone, or can also include the FMS data connectivity partition, which is called the FMS Internal Data Access Function Partition (FIDAP). For example, in certain configurations, the data transactions just involve the client application and the FMF partition, but in other configurations, the data transactions can also involve the FIDAP.

The present method and system provide the benefit that the file transfer is always initiated by the FMS and not by the client application, which never knows the actual FTP port of the FMS. Hence, the client application can never be used to take direct control of what files the FMS retrieves and processes as inputs. This provides a safe and secure way of transferring information into the FMS from the client application.

Further details of various embodiments are described hereafter with reference to the drawings.

FIG. 1 depicts the architecture of a data transfer system 100 for a vehicle, according to one embodiment. The system 100 includes an onboard gateway 110, which can be implemented in hardware or software. The gateway 110 is in operative communication with a vehicle electronics unit 120, and is configured to communicate with at least one application (Client App) 130, such as located on a portable electronic device (e.g., tablet, laptop, smart phone, etc.).

The gateway 110 includes a data communication protocol server module 112, a client application file handler module 114, and a file storage unit 116. The client application file handler module 114 is configured to communicate with application 130 through a data communication protocol such as FTP.

The vehicle electronics unit 120 comprises a first protocol handler module 122, which is configured to communicate with application 130 through gateway 110 by a client/server protocol 140. The vehicle electronics unit 120 also includes a data communication protocol client module 124, which is configured to communicate with the data communication protocol server module 112 in gateway 110 through a data communication protocol such as FTP.

The application 130 includes a second protocol handler module 132 configured to communicate with first protocol handler module 122 through gateway 110 using client/server protocol 140. A gateway file handler module 134 in application 130 communicates with client application file handler module 114 in gateway 110 such as through FTP.

Figure 2:
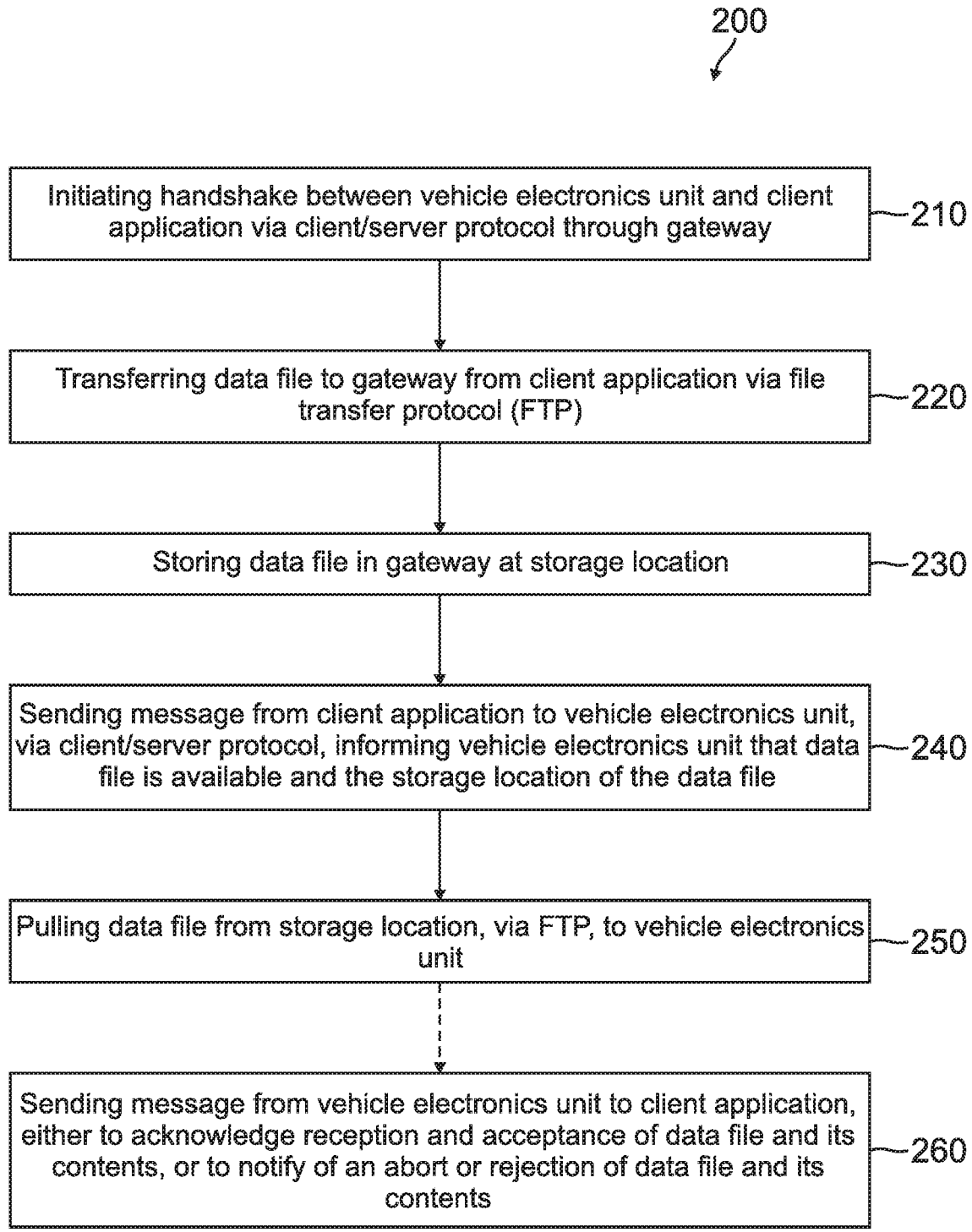
FIG. 2 is a flow diagram of an exemplary operational method for the data transfer system of FIG. 1.

FIG. 2 is a flow diagram of an exemplary operational method 200 for data transfer system 100 (FIG. 1). When a data file is available for transfer to vehicle electronics unit 120 from application 130, method 200 begins by initiating a handshake between vehicle electronics unit 120 and application 130 via client/server protocol 140 through gateway 110 (block 210). The data file is then transferred to gateway 100 from application 130 using a data communication protocol such as FTP (block 220). The data file is stored in gateway 110 in a storage location (block 230), such as in file storage unit 116. The application 130 sends a message to vehicle electronics unit 120, via client/server protocol 140, to inform vehicle electronics unit 120 that the data file is available and the storage location of the data file (block 240). The data file is then pulled from the storage location, such as via FTP, to vehicle electronics unit 120 (block 250). In one implementation, system 100 can cause vehicle electronics unit 120 to automatically pull the data file from the storage location. In another implementation, system 100 can allow an operator to request that vehicle electronics unit 120 pull the data file from the storage location. Thereafter, a message can be sent from vehicle electronics unit 120 to application 130, via client/server protocol 140, either to acknowledge reception and acceptance of the data file and its contents, or to notify of an abort or rejection of the data file and its contents (block 260).

Figure 3:
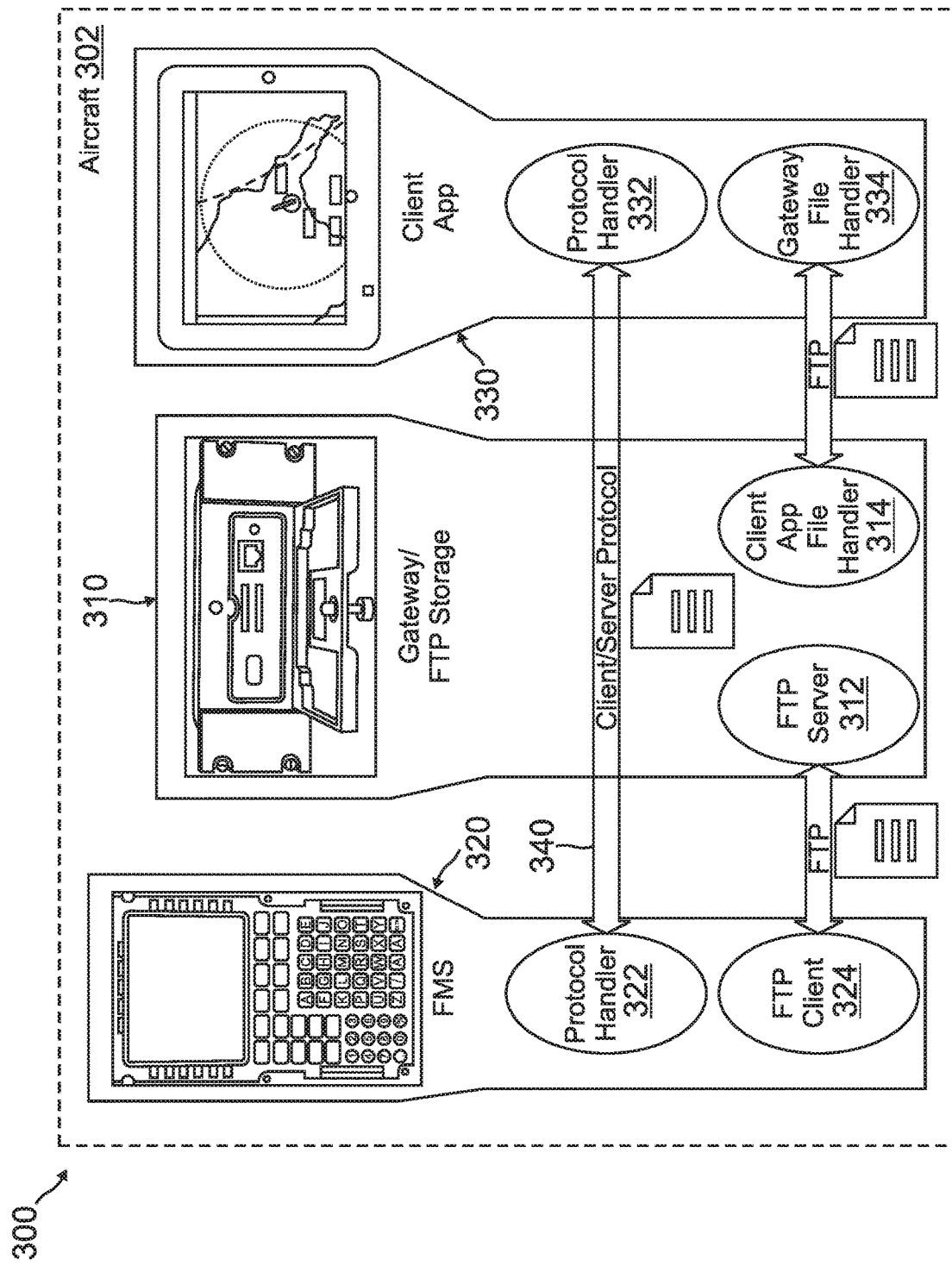
FIG. 3 is a block diagram of a data transfer system for an aircraft, according to one embodiment.

FIG. 3 depicts the architecture of a data transfer system 300, according to one embodiment, which is implemented for an aircraft 302. The system 300 includes an onboard gateway 310 with FTP storage that is in operative communication with an FMS 320 onboard aircraft 302. The gateway 310 is configured to communicate with a client application 330, such as an EFB/PED application located on a portable device.

The gateway 310 includes an FTP server module 312, and a client application file handler module 314. The client application file handler module 314 is configured to communicate with client application 330 through FTP.

The FMS 320 comprises a first protocol handler module 322, which is configured to communicate with client application 330 through gateway 310 by a client/server protocol 340. The FMS 320 also includes an FTP client module 324, which is configured to communicate with FTP server module 312 in gateway 310 through FTP.

The client application 330 includes a second protocol handler module 332 configured to communicate with first protocol handler module 322 through gateway 310 using client/server protocol 340. A gateway file handler module 334 in client application 330 communicates with client application file handler module 314 in gateway 310 through FTP.

Figure 4:
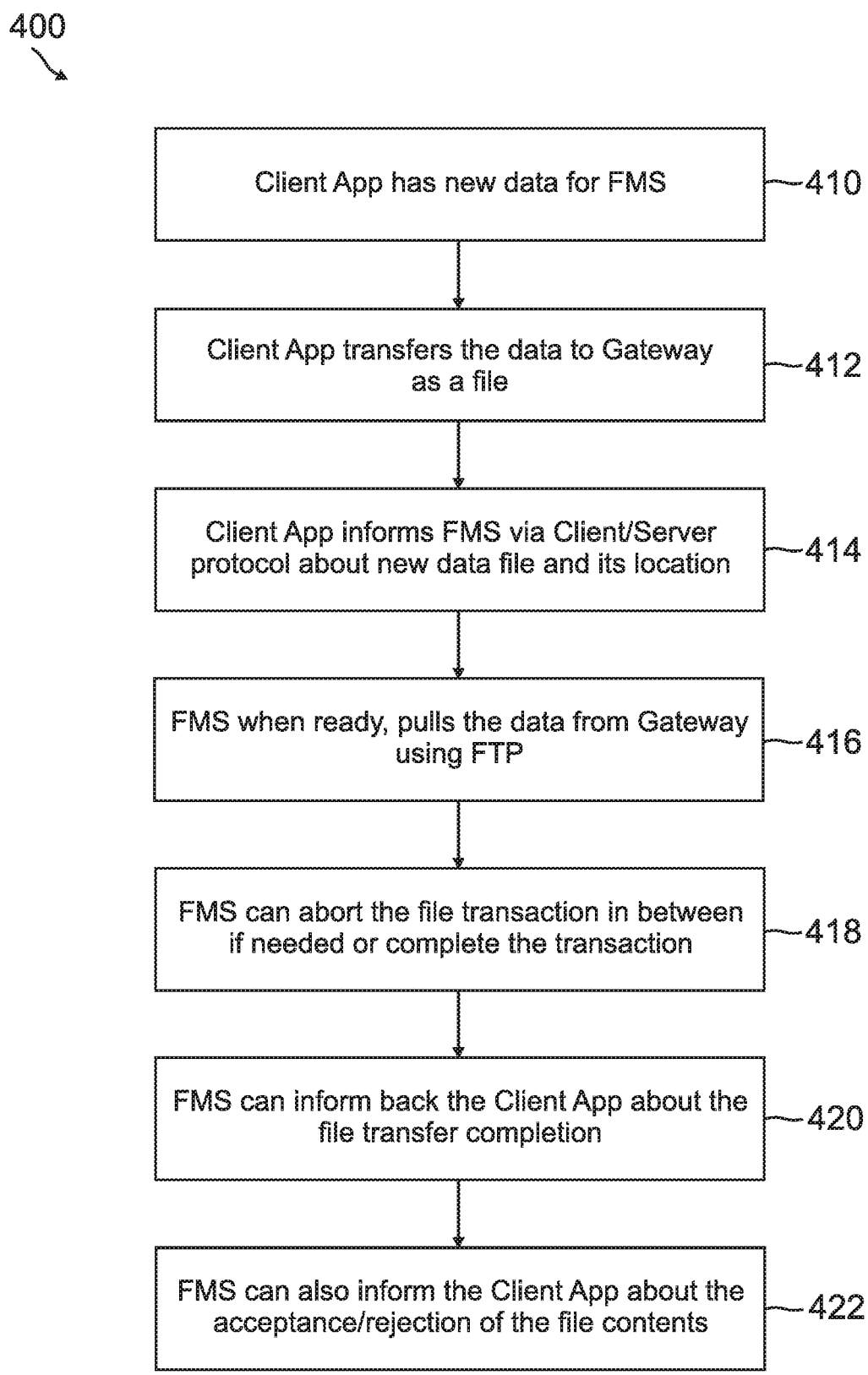
FIG. 4 is a flow diagram of an exemplary operational method for the data transfer system of FIG. 3, in which a data transaction is initiated by a client application.

FIG. 4 is a flow diagram of an exemplary operational method 400 for data transfer system 300 (FIG. 3), according to one implementation, in which a data transaction is initiated by client application 330. Initially, client application 330 has new data for FMS 320 (block 410), and client application 330 transfers the new data to gateway 310 as a data file (block 412). The client application 330 informs FMS 320 via client/server protocol 340 about the new data file and its storage location (block 414). The FMS 320, when ready, pulls the data file from gateway 310 using FTP (block 416). The FMS 320 can abort the file transaction in between, if needed, or complete the file transaction (block 418). The FMS 320 can then inform back client application 330 about the file transfer completion (block 420). The FMS 320 can also inform client application 330 about the acceptance/rejection of the file contents (block 422).

Figure 5:
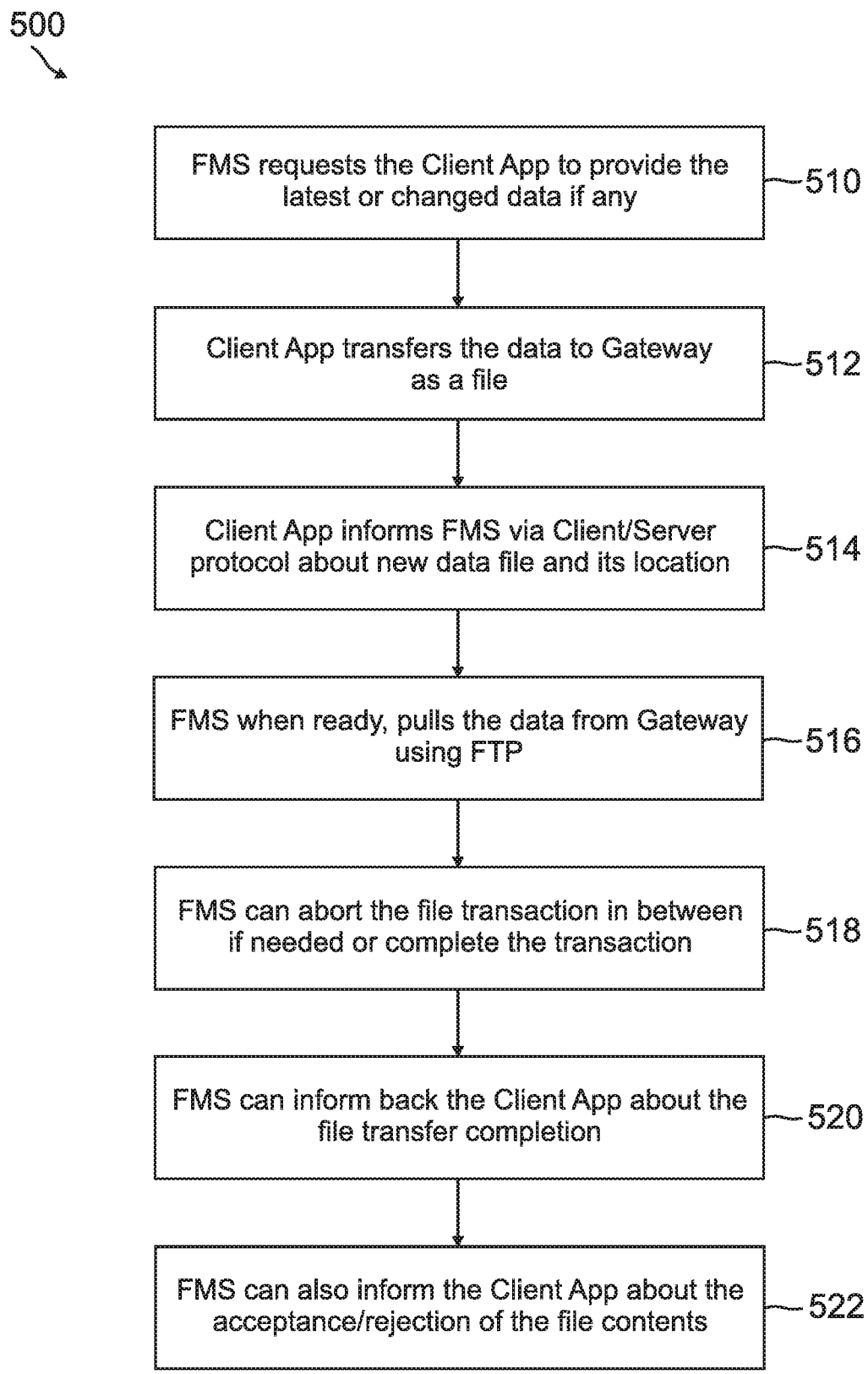
FIG. 5 is a flow diagram of an exemplary operational method for the data transfer system of FIG. 3, in which a data transaction is initiated by a flight management system of the aircraft.

FIG. 5 is a flow diagram of an exemplary operational method 500 for data transfer system 300 (FIG. 3), according to another implementation, in which a data transaction is initiated by FMS 320. Initially, FMS 320 requests client application 330 to provide the latest or changed data, if any (block 510), and client application 330 transfers the requested data to gateway 310 as a data file (block 512). The client application 330 informs FMS 320 via client/server protocol 340 about the new data file and its location (block 514). The FMS, when ready, pulls the data file from gateway 310 using FTP (block 516). The FMS 320 can abort the file transaction in between, if needed, or complete the file transaction (block 518). The FMS 320 can then inform back client application 330 about the file transfer completion (block 520). The FMS 320 can also inform client application 330 about the acceptance/rejection of the file contents (block 522).

In the foregoing methods 400 and 500, there is not any pilot intervention as all of the steps are performed automatically. In both of these methods, there are multiple opportunities where a pilot can optionally be allowed to intervene. For example, the pilot can have either client application 330 or FMS 320 initiate the data transactions.

Figure 6:
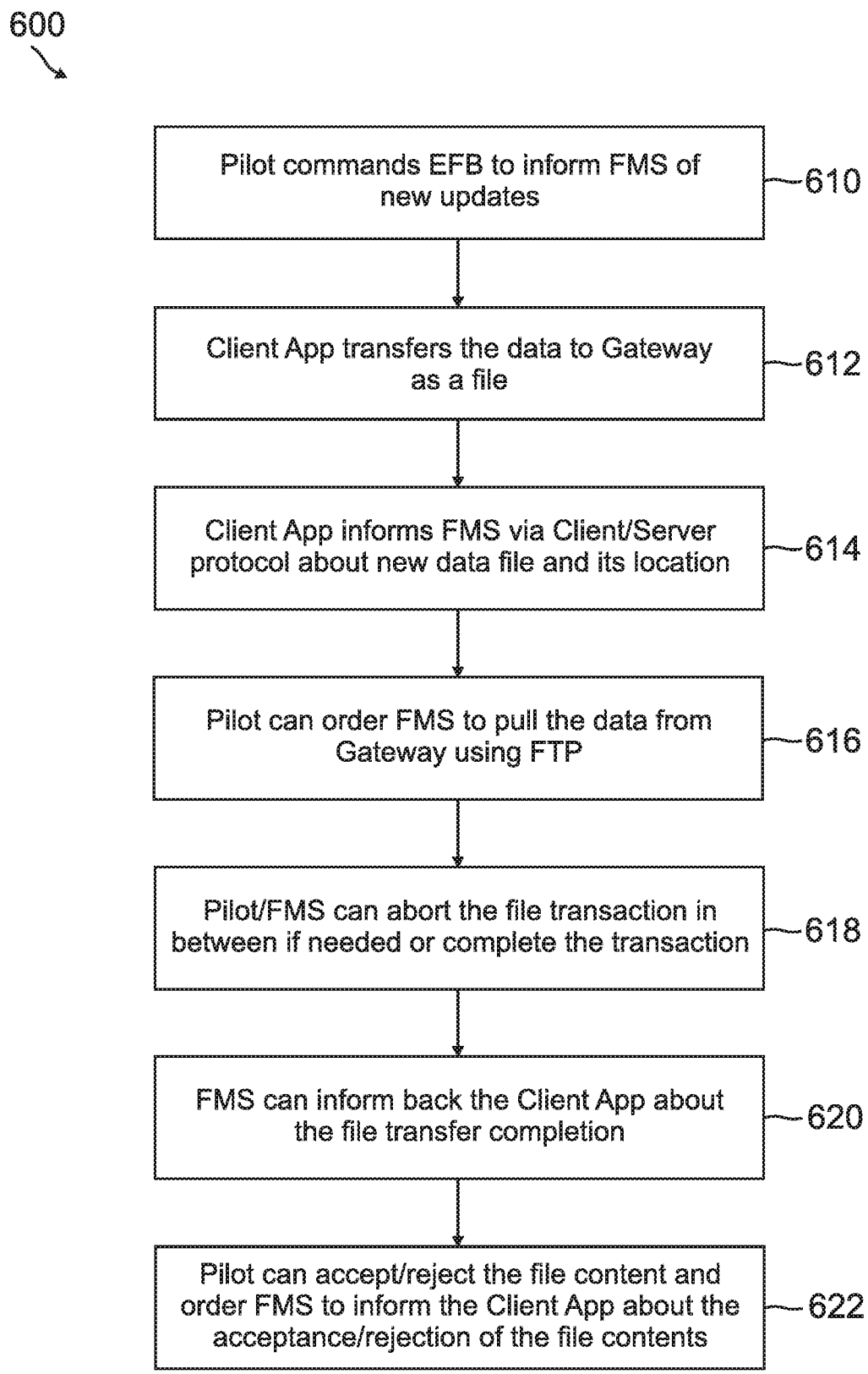
FIG. 6 is a flow diagram of an exemplary operational method for the data transfer system of FIG. 3, in which a data transaction is initiated by a pilot.

FIG. 6 is a flow diagram of an exemplary operational method 600, in which a data transaction is initiated by a pilot. Initially, the pilot commands an EFB with client application 330 to inform FMS 320 of new data updates (block 610), and client application 330 transfers the data updates to gateway 310 as a data file (block 612). The client application 330 informs FMS 320 via client/server protocol 340 about the new data file and its location (block 614). The pilot can order FMS 320 to pull the data file from gateway 310 using FTP (block 616). The pilot or FMS 320 can abort the file transaction in between, if needed, or complete the file transaction (block 618). The FMS 320 can inform back client application 330 about the file transfer completion (block 620). The pilot can accept/reject the file content and order FMS 320 to inform client application 330 about the acceptance/rejection of the file contents (block 622).

FIGS. 7A-7J are block diagrams showing the operational flow of an exemplary method for data transfer according to the present approach, implemented in an aircraft environment. As shown, the data transfer occurs using a portable device 710 that hosts a client application, such as an EFB, an onboard gateway 720 with file storage 722, and avionics that include a FIDAP 730, an FMS 740, and a cockpit display 750.

Figure 7A:
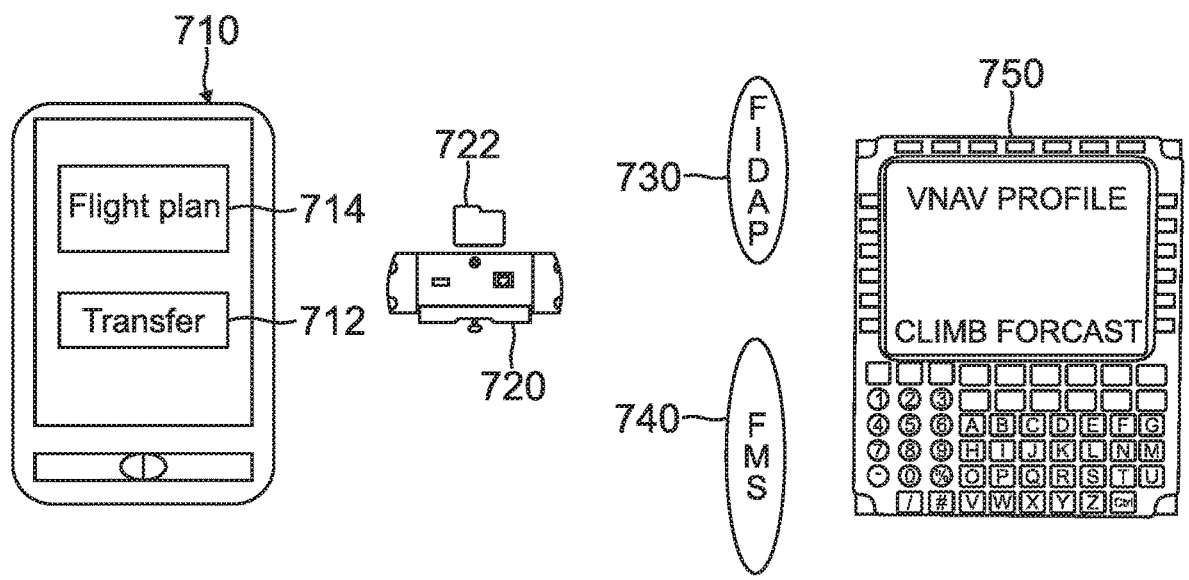
FIGS. 7A-7J are block diagrams of the operational flow of an exemplary method for data transfer according to one implementation in an aircraft environment.
Figure 7B:
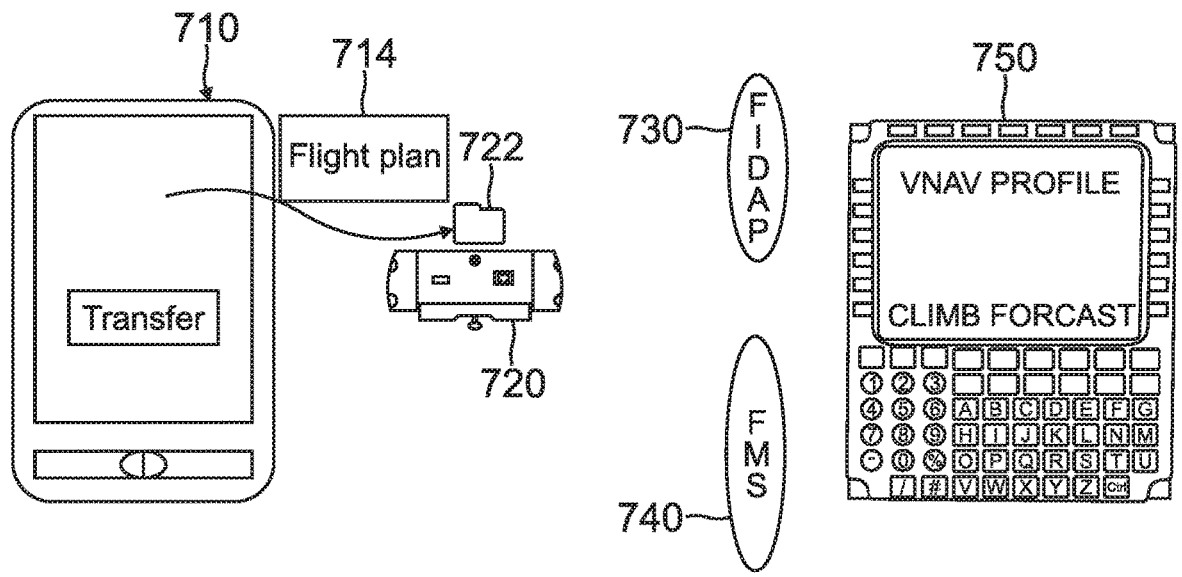

As depicted in FIG. 7A, a data transfer 712 is initiated by the client application on portable device 710 when a new data is available, such as a new flight plan 714. The portable device 710 can display an appropriate message such as "Transfer" on its screen. The flight plan 714 is sent to gateway 720 from portable device 710 and saved in file storage 722 as a new data file, as shown in FIG. 7B.

Figure 7C:
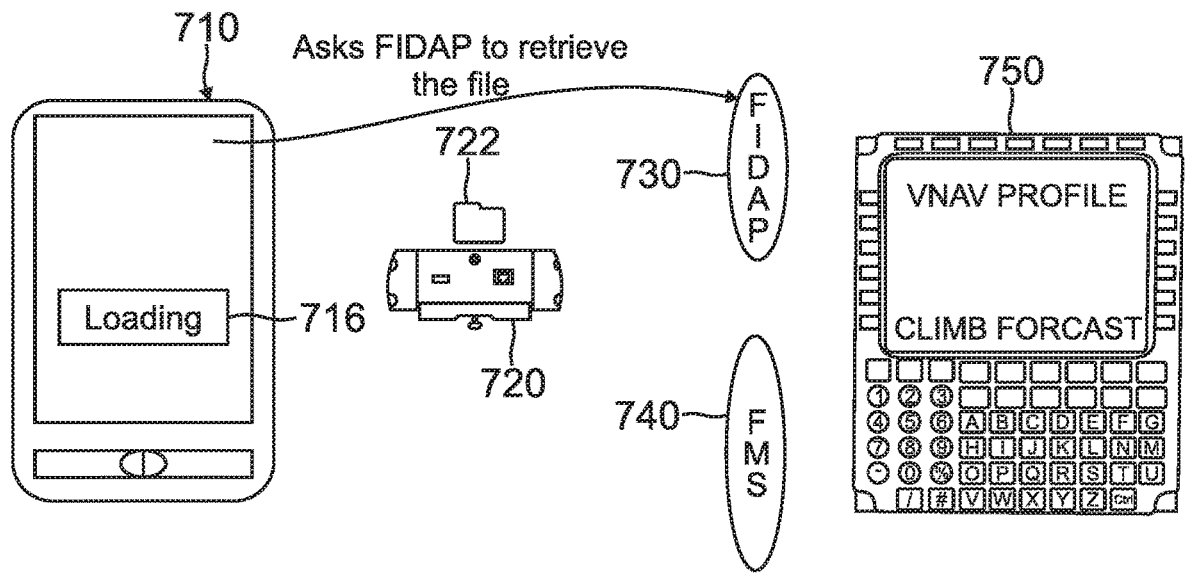
Figure 7D:
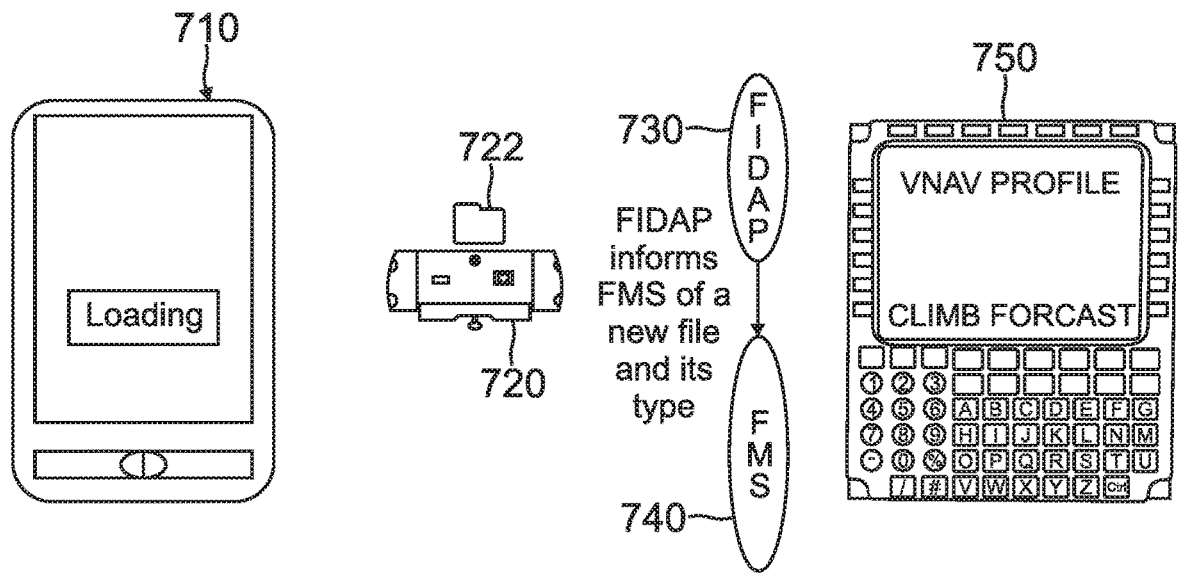

During a loading operation 716, the client application informs FIDAP 730 about the availability of the new data file and its location, and asks FIDAP 730 to retrieve the new data file, as illustrated in FIG. 7C. The portable device 710 can display an appropriate message such as "Loading" on its screen. The FIDAP 730 then informs FMS 740 about the availability of the new data file and its type, as shown in FIG. 7D.

Figure 7E:
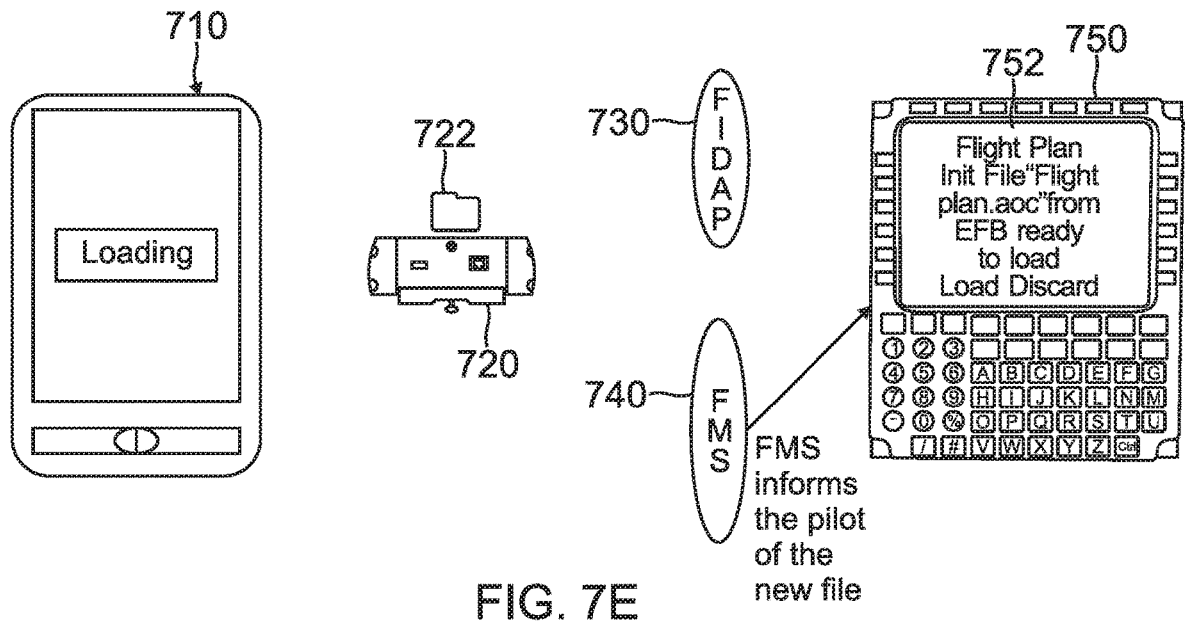
Figure 7F:
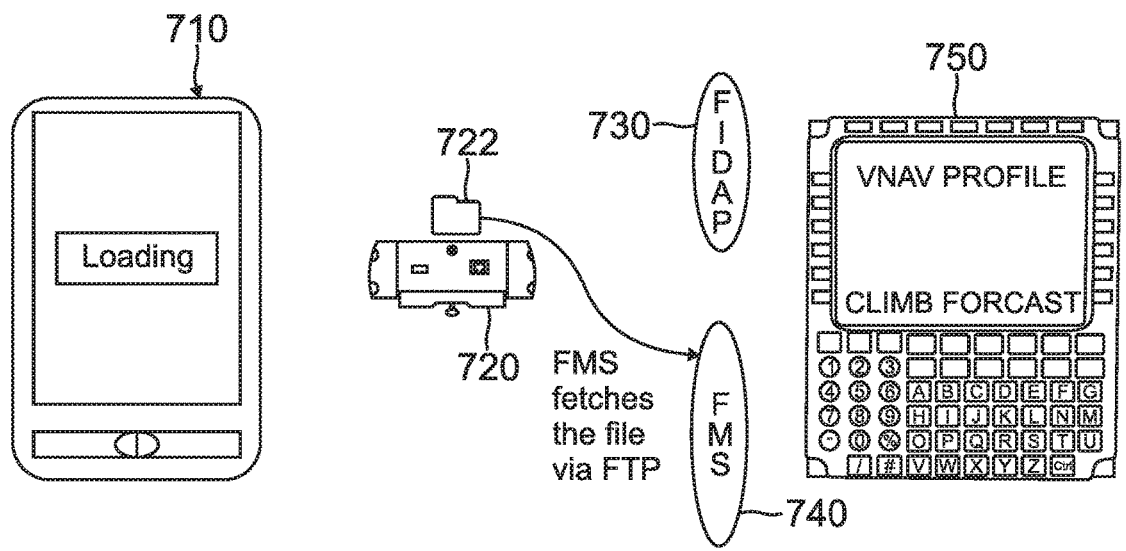

In an optional step, FMS 740 allows the pilot to initiate the fetching of the new data file, as illustrated in FIG. 7E. The FMS 740 informs the pilot of the new data file by displaying a message on cockpit display 750 that allows for pilot input, such as an MCDU page 752. As depicted in FIG. 7F, FMS 740 fetches the new data file via FTP from file storage 722 in gateway 720. The trigger to retrieve the new data file can be done by the pilot (FIG. 7IE), or can be automatically done by FMS 740 based on information from FIDAP 730.

Figure 7G:
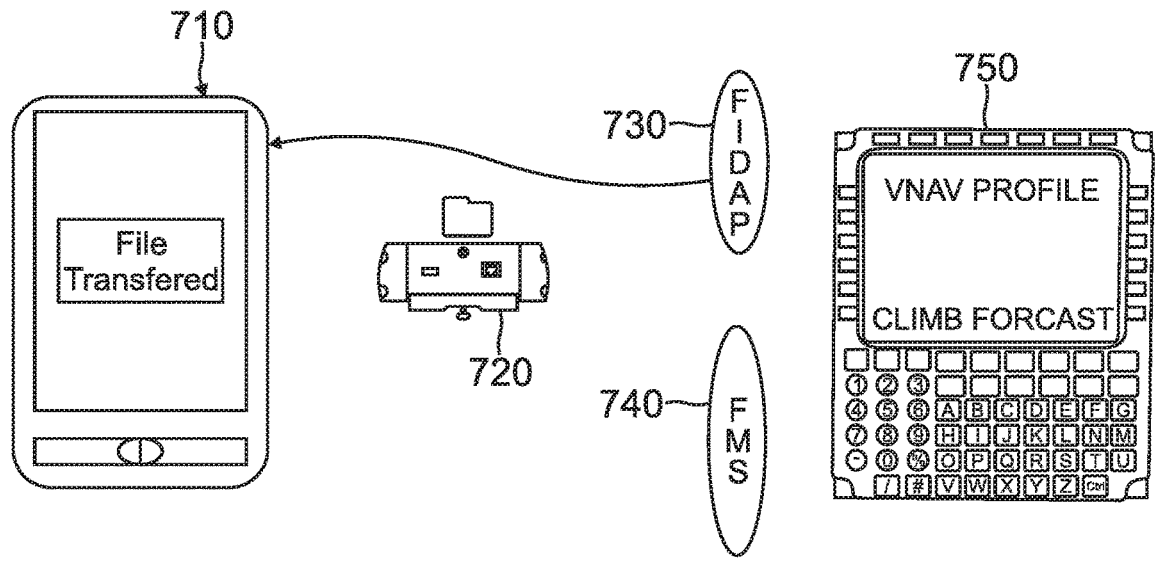
Figure 7H:
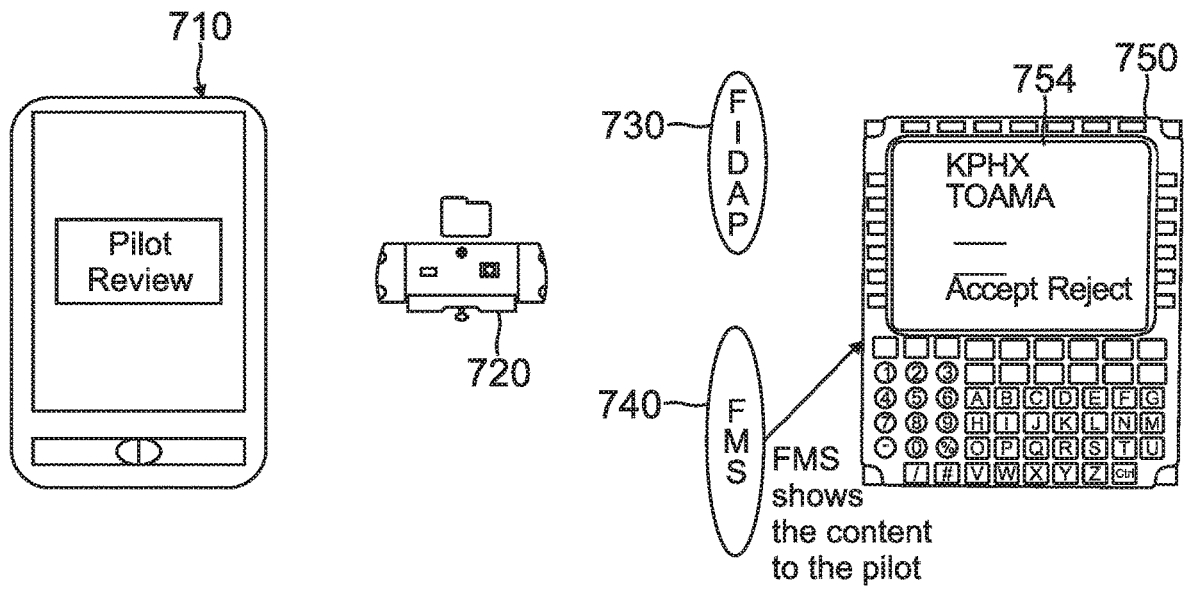
Figure 7I:
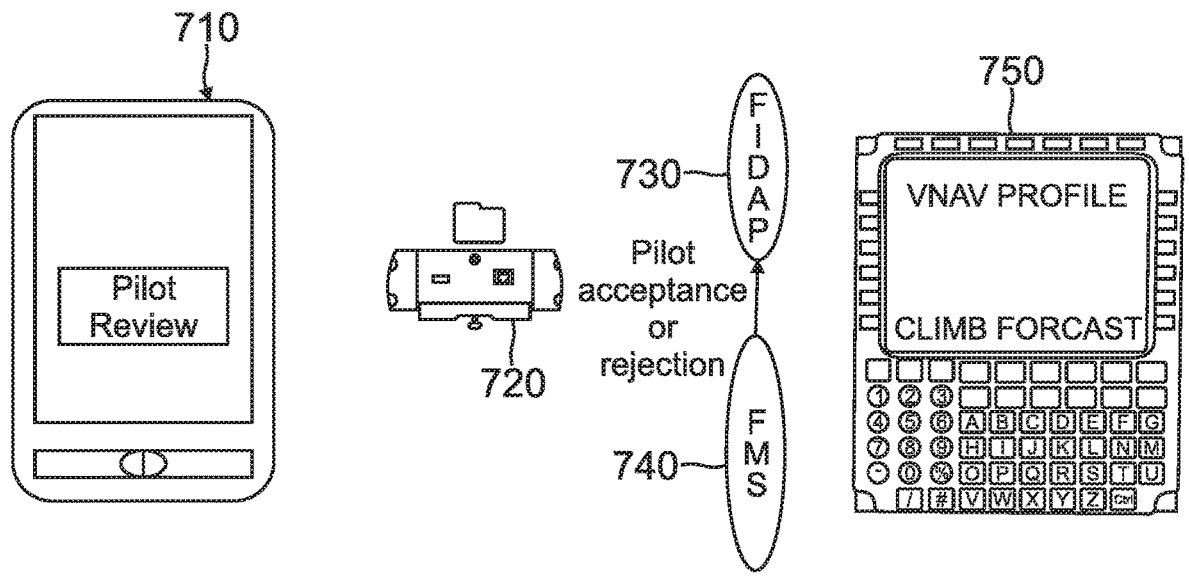
Figure 7J:
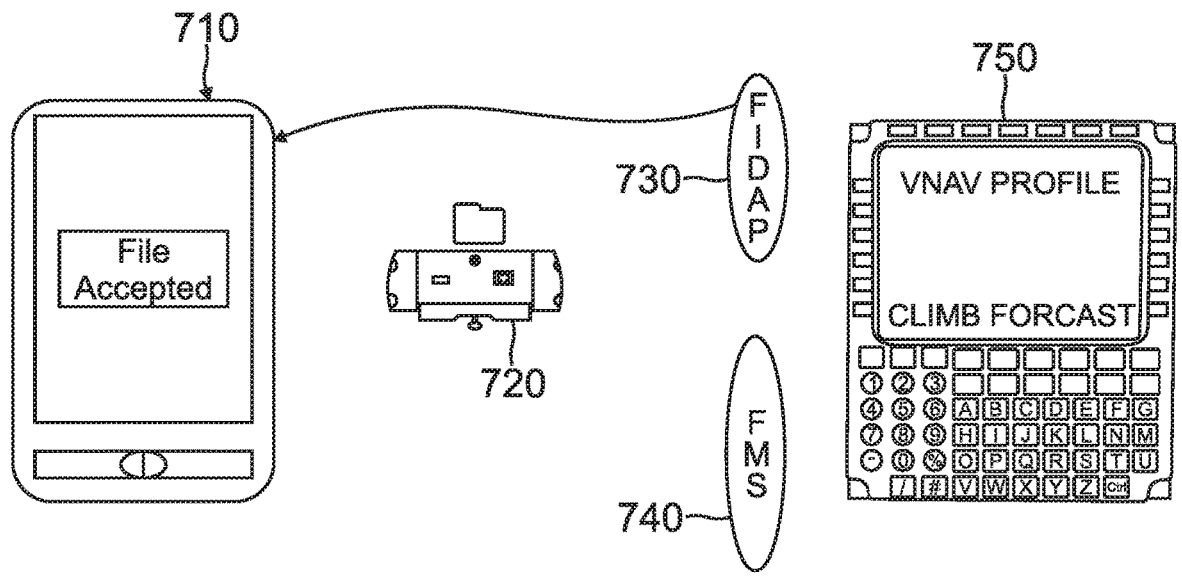

As shown in FIG. 7G, FIDAP 730 informs the client application of the file transfer completion, and portable device 710 can display an appropriate message such as "File Transferred" on its screen. As illustrated in FIG. 7H, FMS 740 can show the content of the transferred data file on cockpit display 750 for review by the pilot, such as on an MCDU page 754, and portable device 710 can display an appropriate message such as "Pilot Review" on its screen. The FMS 740 then informs FIDAP 730 about the pilot acceptance or rejection of the data file, as shown in FIG. 7I. The FIDAP 730 informs the client application about the pilot decision, and portable device 710 can display an appropriate message such as "File Accepted" on its screen, as depicted in FIG. 7J.

A processor used in the present systems can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method of transferring data, the method comprising: initiating a handshake between an electronics unit onboard a vehicle and an application via a first communication protocol through an onboard gateway; transferring a data file to the gateway from the application via a second communication protocol; storing the data file in the gateway at a storage location; sending a message from the application to the electronics unit, via the first communication protocol, to inform the electronics unit that the data file is available and the storage location of the data file; and pulling the data file from the storage location, via the second communication protocol, to the electronics unit.

Example 2 includes the method of Example 1, further comprising sending a message from the electronics unit to the application, either to acknowledge reception and acceptance of the data file and its contents, or to notify of an abort or rejection of the data file and its contents.

Example 3 includes the method of any of Examples 1-2, wherein the electronics unit automatically pulls the data file from the storage location.

Example 4 includes the method of any of Examples 1-2, wherein the electronics unit pulls the data file from the storage location after receiving a request from a vehicle operator.

Example 5 includes the method of any of Examples 1-4, wherein the first communication protocol comprises a client/server protocol; and the second communication protocol comprises a file transfer protocol (FTP).

Example 6 includes the method of any of Examples 1-5, wherein the application is hosted on a portable electronic device.

Example 7 includes the method of any of Examples 1-6, wherein the vehicle comprises an aircraft; the electronics unit comprises an avionics unit that includes a flight management system (FMS); and the application comprise an electronic flight bag (EFB) application.

Example 8 includes the method of Example 7, wherein the application informs the FMS via the first communication protocol about availability of the data file and the storage location; and the FMS pulls the data file from the storage location using an FTP transaction.

Example 9 includes the method of Example 8, wherein the FMS is configured to abort the FTP transaction if needed.

Example 10 includes the method of Example 9, wherein the FMS is configured to inform the application of reception and acceptance of the data file and its contents, or notify the application of an abort or rejection of the data file and its contents.

Example 11 includes the method of Example 7, wherein a pilot of the aircraft is given an option to initiate the application to inform the FMS of availability of the data file; or initiate the FMS to request the application to provide the data file.

Example 12 includes the method of Example 11, wherein the pilot is given the option to initiate the FMS to pull the data file from the storage location using an FTP transaction.

Example 13 includes the method of Example 12, wherein the pilot is given the option to abort the FTP transaction.

Example 14 includes the method of Example 13, wherein the pilot is given the option to accept or reject the data file, and direct the FMS to the inform application about the acceptance or rejection of the data file.

Example 15 includes a data transfer system, comprising: a vehicle electronics unit that comprises a first protocol handler module configured to communicate with a client application through a client/server protocol, and a data communication protocol client module; an onboard gateway in operative communication with the vehicle electronics unit, the gateway comprising: a data communication protocol server module that operatively communicates with the data communication protocol client module through a data communication protocol, a client application file handler module that operatively communicates with the client application through the data communication protocol, and a data file storage unit; wherein the client application includes a second protocol handler module configured to communicate with the first protocol handler module through the gateway using the client/server protocol, and a gateway file handler module configured to communicate with the client application file handler module in the gateway. When a data file is available for transfer, the system is operative to initiate a handshake between the vehicle electronics unit and the client application via the client/server protocol through the gateway; transfer the data file to the gateway from the client application via the data communication protocol; store the data file in the gateway at a storage location; send a message from the client application to the vehicle electronics unit, via the client/server protocol, to inform the vehicle electronics unit that the data file is available and the storage location of the data file; and pull the data file from the storage location, via the data communication protocol, to the vehicle electronics unit.

Example 16 includes the data transfer system of Example 15, wherein the system is further operative to send a message from the vehicle electronics unit to the client application, either to acknowledge reception and acceptance of the data file and its contents, or to notify of an abort or rejection of the data file and its contents.

Example 17 includes the data transfer system of any of Examples 15-16, wherein the vehicle electronics unit is configured to automatically pull the data file from the storage location; or pull the data file from the storage location after receiving a request from a vehicle operator.

Example 18 includes the data transfer system of any of Examples 15-17, wherein the data communication protocol comprises FTP.

Example 19 includes the data transfer system of any of Examples 15-18, wherein the vehicle electronics unit comprises an avionics unit that includes a FMS onboard an aircraft; and the gateway is onboard the aircraft.

Example 20 includes a data transfer system, comprising: an FMS onboard an aircraft that comprises a first protocol handler module configured to communicate with a client application through a client/server protocol, and an FTP client module; an onboard gateway in operative communication with the FMS, the gateway comprising an FTP server module configured to communicate with the FTP client module through FTP, and a client application file handler module configured to communicate with the client application through FTP; wherein the client application includes a second protocol handler module configured to communicate with the first protocol handler module through the gateway using the client/server protocol. When a data file is available for transfer to the FMS from the client application, the system is operative to initiate a handshake between the FMS and the client application via the client/server protocol through the gateway; transfer the data file to the gateway from the client application via FTP; cause the client application to inform the FMS, via the client/server protocol, that the data file is available and a storage location of the data file; cause the FMS to pull the data file from the storage location via FTP, or allow an operator to request that the FTP pull the data file from the storage location to the FTP; and cause the FTP to notify the client application of the reception and acceptance of the data file and its contents, or the abort or rejection of the data file and its contents.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of transferring data, the method comprising:
   facilitating a handshake between an electronics unit onboard an aircraft and an electronic flight bag (EFB) application through a gateway onboard the aircraft, the electronics unit comprising an avionics unit including a flight management system (FMS);
   after completing the handshake, receiving a data file with new data updates via the gateway based on a data transaction initiated from the EFB application;
   storing the data file in the gateway at a storage location having an address;
   transmitting a message via client/server protocol to the electronics unit to inform the electronics unit that the data file is available and to inform the electronics unit of the address of the data file; and
   based on a pull initiated by the electronics unit from the address provided in the message, transferring the data file from the storage location to the electronics unit using File Transfer Protocol (FTP).

2. The method of claim 1, further comprising:
   transmitting a message from the electronics unit to the application, either to acknowledge reception and acceptance of the data file and its contents, or to notify of an abort or rejection of the data file and its contents.

3. The method of claim 1, wherein the pull is initiated by the electronics unit automatically, without acceptance from a vehicle operator.

4. The method of claim 1, wherein the pull is initiated after a request is received from a vehicle operator.

5. The method of claim 1, wherein:
   the facilitating step and the transmitting step are performed via a first communication protocol, wherein the first communication protocol comprises the client/server protocol; and
   the receiving step and the transferring step are performed via a second communication protocol, wherein the second communication protocol comprises the file transfer protocol (FTP).

6. The method of claim 1, wherein the application is hosted on a portable electronic device.

7. The method of claim 1, further comprising:
   aborting the transferring step based on an instruction from the FMS.

8. The method of claim 1, further comprising:
   transmitting a notification from the FMS to the application notifying the application of (a) reception and acceptance of the data file and its contents, or (b) an abort or rejection of the data file and its contents.

9. A data transfer system, comprising:
   a gateway onboard an aircraft, the gateway having a processor and a memory, wherein the gateway is in operative communication with a vehicle electronics unit and configured to communicate with the vehicle electronics unit and with an electronic flight bag (EFB) application, the electronics unit comprising an avionics unit that includes a flight management system (FMS), wherein the processor of the gateway is operative to execute instructions stored in the memory to:
   facilitate a handshake between the vehicle electronics unit and the EFB application through the gateway;
   after completing the handshake, receive a data file with new data updates based on a data transaction initiated from the EFB application;
   store the data file in the gateway at a storage location having an address;
   transmit a message via client/server protocol to the vehicle electronics unit to inform the vehicle electronics unit that the data file is available and to inform the electronics unit of the address of the data file; and based on a pull initiated by the electronics unit from the address provided in the message, transfer the data file from the storage location to the vehicle electronics unit using File Transfer Protocol (FTP).

10. The data transfer system of claim 9, wherein the processor of the gateway is further operative to execute instructions stored in the memory to:

transmit a message from the vehicle electronics unit to the EFB application (a) to acknowledge reception and acceptance of the data file and its contents, or to notify of an abort or rejection of the data file and its contents.

11. The data transfer system of claim 9, wherein the pull is initiated by the electronics unit automatically, without acceptance from a vehicle operator.

12. The data transfer system of claim 9, wherein the facilitating step and the transmitting step are performed via a first communication protocol comprising the client/server protocol; and the receiving step and the transferring step are performed via a second communication protocol comprising the file transfer protocol (FTP).

13. A data transfer system, comprising:

a gateway onboard an aircraft, the gateway having a processor and a memory, wherein the gateway is in operative communication with a flight management system (FMS) and configured to communicate with an electronic flight bag (EFB) application, wherein the processor of the gateway is operative to execute instructions stored in the memory to:

facilitate a handshake between a vehicle electronics unit and the EFB application through the gateway, wherein the electronics unit comprises an avionics unit that includes the FMS;

after completing the handshake, receive a data file with new data updates based on a data transaction initiated from the EFB application;

inform the FMS via client/server protocol that the data file is available and inform the FMS of a storage location of the data file, the storage location having an address;

based on a data pull from the address, transfer the data file from the storage location to the FMS using File Transfer Protocol (FTP); and notify the client application of (a) reception and acceptance of the data file and its contents, or (b) abort or rejection of the data file and its contents.

14. The method of claim 1, wherein the facilitating, transmitting, and transferring steps are performed by the gateway.

15. The method of claim 1, wherein the data file is received by the gateway via the application pushing the data file to the gateway.

16. The method of claim 1, further comprising:

before the gateway receives the data file, receiving a request from the electronics unit for updated information, wherein the data file includes the updated information.

17. The data transfer system of claim 9, wherein the processor of the gateway is further operative to execute instructions stored in the memory to:

before the gateway receives the data file, receive a request from the electronics unit for updated information, wherein the data file includes the updated information.

\* \* \* \* \*